US011614716B2

(12) United States Patent
Liang et al.

(10) Patent No.: US 11,614,716 B2
(45) Date of Patent: Mar. 28, 2023

(54) PRESSURE-SENSING SYSTEM FOR A WEARABLE ELECTRONIC DEVICE

(71) Applicant: Apple Inc., Cupertino, CA (US)

(72) Inventors: Jiahui Liang, Sunnyvale, CA (US);
Tyler S. Bushnell, Mountain View, CA (US); Sherry Tang, Cupertino, CA (US); Shannon Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 16/890,694

(22) Filed: Jun. 2, 2020

(65) Prior Publication Data

US 2021/0088981 A1     Mar. 25, 2021

Related U.S. Application Data

(60) Provisional application No. 62/904,385, filed on Sep. 23, 2019.

(51) Int. Cl.
*G04G 21/02* (2010.01)
*G04G 17/08* (2006.01)
(Continued)

(52) U.S. Cl.
CPC .......... *G04G 21/02* (2013.01); *G01L 19/0092* (2013.01); *G01N 27/223* (2013.01);
(Continued)

(58) Field of Classification Search
CPC ............... G01L 27/002; G01L 19/0092; G01L 27/007; H04R 1/083; H04R 2201/023;
(Continued)

(56) References Cited

U.S. PATENT DOCUMENTS

| 3,950,627 A | 4/1976 | Murata et al. |
| 5,041,330 A | 8/1991 | Heerton et al. |

(Continued)

FOREIGN PATENT DOCUMENTS

| CN | 102565149 | 7/2012 |
| CN | 202713849 | 1/2013 |

(Continued)

OTHER PUBLICATIONS

U.S. Appl. No. 16/904,294, filed Jun. 17, 2020, Crowley et al.
(Continued)

*Primary Examiner* — Edwin A. Leon
(74) *Attorney, Agent, or Firm* — Brownstein Hyatt Farber Schreck, LLP

(57) ABSTRACT

Embodiments include a wearable electronic device including a housing having an internal wall separating an internal chamber from an external chamber, an outer shell defining a port that connects the external chamber to an external environment, a membrane positioned at an opening in the internal wall and configured to equalize a pressure within the internal chamber with a pressure of the external environment, a first pressure-sensing device positioned in the internal chamber and configured to produce a first output, a second pressure-sensing device positioned in the external chamber and configured to produce a second output, and a processing unit configured to estimate the pressure of the external environment using the second output in accordance with a determination an accuracy condition satisfies a criteria and estimate the pressure of the external environment using the first output in accordance with a determination the accuracy condition does not satisfy the criteria.

20 Claims, 9 Drawing Sheets

(51) Int. Cl.
*G04G 17/04* (2006.01)
*G01N 27/22* (2006.01)
*H04R 1/28* (2006.01)
*G01L 19/00* (2006.01)

(52) U.S. Cl.
CPC .............. *G04G 17/04* (2013.01); *G04G 17/08* (2013.01); *H04R 1/2842* (2013.01); *H04R 2201/023* (2013.01)

(58) Field of Classification Search
CPC ...... H04R 1/2842; H04R 1/028; H04R 1/342; H04R 1/2803; H04R 1/04; G04G 21/02; G04G 17/08; G04G 17/02; G04G 17/04; G04G 17/045; G01N 27/223; G06F 3/016
See application file for complete search history.

(56) References Cited

U.S. PATENT DOCUMENTS

| | | | |
|---|---|---|---|
| 5,179,505 A | 1/1993 | Matsuo | |
| 5,258,592 A | 11/1993 | Nishikawa et al. | |
| 5,373,487 A | 12/1994 | Crawford et al. | |
| 5,889,737 A | 3/1999 | Alameh et al. | |
| 6,166,662 A | 12/2000 | Chuang | |
| 6,219,304 B1 | 4/2001 | Mignot et al. | |
| 6,292,358 B1 | 9/2001 | Lee et al. | |
| 6,389,143 B1 | 5/2002 | Leedom et al. | |
| 6,501,036 B2 | 12/2002 | Rochon et al. | |
| 6,855,173 B2 | 2/2005 | Ehrnsperger et al. | |
| 6,963,039 B1 | 11/2005 | Weng et al. | |
| 7,075,781 B2 | 7/2006 | Peng | |
| 7,087,850 B1 | 8/2006 | Murzanski | |
| 7,230,196 B2 | 6/2007 | Toyama | |
| 7,269,100 B2 | 9/2007 | Gilomen | |
| 7,355,137 B2 | 4/2008 | Kawasaki et al. | |
| 7,361,859 B2 | 4/2008 | Yoshioka et al. | |
| 7,365,281 B2 | 4/2008 | Yamaguchi et al. | |
| 7,580,533 B2 | 8/2009 | Schwartz | |
| 7,748,272 B2 | 7/2010 | Kranz et al. | |
| 7,764,936 B2 | 7/2010 | Nakasano et al. | |
| 7,850,378 B1 | 12/2010 | Ligtenberg et al. | |
| 7,865,210 B2 | 1/2011 | Wang et al. | |
| 7,958,784 B2 | 6/2011 | Chouraku et al. | |
| 8,050,716 B2 | 11/2011 | Shin et al. | |
| 8,055,003 B2 | 11/2011 | Mittleman et al. | |
| 8,059,490 B2 | 11/2011 | Rapps et al. | |
| 8,092,691 B2 | 1/2012 | Youngs et al. | |
| D653,640 S | 2/2012 | Kwon et al. | |
| 8,178,808 B2 | 5/2012 | Strittmatter et al. | |
| 8,231,795 B2 | 7/2012 | Martin et al. | |
| 8,263,886 B2 | 9/2012 | Lin et al. | |
| 8,299,601 B2 | 10/2012 | Oka et al. | |
| 8,367,928 B2 | 2/2013 | Hsu et al. | |
| 8,371,866 B1 | 2/2013 | Su et al. | |
| 8,381,575 B2 | 2/2013 | Seo | |
| 8,416,542 B2 | 4/2013 | Nakamura | |
| 8,446,713 B2 | 5/2013 | Lai | |
| 8,462,514 B2 | 6/2013 | Myers et al. | |
| 8,470,252 B2 | 6/2013 | Odueyungbo | |
| 8,500,348 B2 | 8/2013 | Dumont et al. | |
| 8,482,305 B2 | 9/2013 | Johnson | |
| 8,526,175 B2 | 9/2013 | Yukawa et al. | |
| 8,562,095 B2 | 10/2013 | Alleyne et al. | |
| 8,591,240 B2 | 11/2013 | Jenks | |
| 8,614,897 B2 | 12/2013 | Tang | |
| 8,624,144 B2 | 1/2014 | Chiang | |
| 8,644,011 B2 | 2/2014 | Parkinson | |
| 8,683,861 B2 | 4/2014 | Humbert et al. | |
| 8,767,381 B2 | 7/2014 | Shukla et al. | |
| 8,770,996 B2 | 7/2014 | Hsu | |
| 8,800,764 B2 | 8/2014 | Wu | |
| 8,804,993 B2 | 8/2014 | Shukla et al. | |
| 8,826,558 B2 | 9/2014 | Priebe et al. | |
| 8,844,158 B2 | 9/2014 | Dehn | |
| 8,942,401 B2 | 1/2015 | Murayama | |
| 8,960,818 B2 | 2/2015 | Myers et al. | |
| 8,994,827 B2 | 3/2015 | Mistry et al. | |
| 9,013,888 B2 | 4/2015 | Trzaskos et al. | |
| 9,072,991 B2 | 7/2015 | Winters et al. | |
| 9,080,961 B2 | 7/2015 | Adachi | |
| 9,084,053 B2 | 7/2015 | Parkins | |
| 9,084,357 B2 | 7/2015 | Shedletsky et al. | |
| 9,099,264 B2 | 8/2015 | Shedletsky et al. | |
| 9,105,420 B2 | 8/2015 | Shah et al. | |
| 9,129,757 B2 | 9/2015 | Kanbayashi et al. | |
| 9,161,434 B2 | 10/2015 | Merz et al. | |
| 9,164,539 B2 | 10/2015 | Wu | |
| 9,171,535 B2 | 10/2015 | Abe et al. | |
| 9,226,076 B2 | 12/2015 | Lippert et al. | |
| 9,240,292 B1 | 1/2016 | Lapetina | |
| 9,253,297 B2 | 2/2016 | Abe et al. | |
| 9,274,506 B2 | 3/2016 | Lu et al. | |
| 9,335,355 B2 | 5/2016 | Menzel et al. | |
| 9,363,587 B2 | 6/2016 | Weiss et al. | |
| 9,363,589 B2 | 6/2016 | Lippert et al. | |
| 9,367,104 B2 | 6/2016 | Liu | |
| 9,387,647 B2 | 7/2016 | Wei et al. | |
| 9,408,009 B1 | 8/2016 | Witte et al. | |
| 9,444,506 B2 | 9/2016 | Lai et al. | |
| 9,445,633 B2 | 9/2016 | Tulloch et al. | |
| 9,529,391 B2 | 12/2016 | Ely | |
| 9,573,165 B2 | 2/2017 | Weber et al. | |
| 9,575,392 B2 | 2/2017 | Hooton | |
| 9,625,944 B2 | 4/2017 | Weber | |
| 9,627,797 B2 | 4/2017 | Song et al. | |
| 9,648,744 B2 | 5/2017 | Wittenberg et al. | |
| D790,517 S | 6/2017 | Akana et al. | |
| 9,780,554 B2 | 10/2017 | Kardassakis et al. | |
| 9,811,121 B2 | 11/2017 | Cardinali et al. | |
| 9,832,567 B2 | 11/2017 | Zhang et al. | |
| 9,880,523 B2 | 1/2018 | Suwald | |
| 9,939,783 B2 | 4/2018 | Hilario et al. | |
| 9,980,026 B2 | 5/2018 | Zadesky et al. | |
| 10,021,800 B1 | 7/2018 | Zhang et al. | |
| 10,165,694 B1 | 12/2018 | Werner et al. | |
| 10,275,143 B2 | 4/2019 | Nagaraju et al. | |
| 10,496,209 B2 | 12/2019 | Vummidi Murali et al. | |
| 10,606,374 B2 | 3/2020 | Park et al. | |
| 11,334,032 B2 * | 5/2022 | Liang .................... H04R 1/028 |
| 2006/0210062 A1 | 9/2006 | DeMichele et al. | |
| 2007/0003081 A1 | 1/2007 | Ram et al. | |
| 2008/0302641 A1 | 12/2008 | Su | |
| 2009/0002941 A1 | 1/2009 | Mongia et al. | |
| 2009/0281251 A1 | 11/2009 | Bae et al. | |
| 2010/0232861 A1 | 9/2010 | Shibata et al. | |
| 2011/0103621 A1 | 5/2011 | Lutz | |
| 2012/0067711 A1 | 3/2012 | Yang | |
| 2013/0037396 A1 | 2/2013 | Yu | |
| 2013/0043115 A1 | 2/2013 | Yang et al. | |
| 2013/0146491 A1 | 6/2013 | Ghali et al. | |
| 2013/0170685 A1 | 7/2013 | Oh et al. | |
| 2013/0242481 A1 | 9/2013 | Kim et al. | |
| 2016/0058375 A1 | 3/2016 | Rothkopf et al. | |
| 2016/0379767 A1 | 12/2016 | Ely | |
| 2017/0086321 A1 | 3/2017 | de Jong et al. | |
| 2017/0086743 A1* | 3/2017 | Bushnell ................ A61B 5/681 |
| 2017/0089698 A1* | 3/2017 | Ehman .................... G01C 5/06 |
| 2017/0094796 A1 | 3/2017 | Lor et al. | |
| 2017/0181303 A1 | 6/2017 | Li et al. | |
| 2018/0068808 A1 | 3/2018 | Wang et al. | |
| 2019/0072384 A1* | 3/2019 | Macneil .................. G01L 19/14 |
| 2019/0082547 A1 | 3/2019 | Werner et al. | |
| 2021/0397140 A1 | 12/2021 | Crowley et al. | |

FOREIGN PATENT DOCUMENTS

| | | |
|---|---|---|
| CN | 103974604 | 8/2014 |
| CN | 203811997 | 9/2014 |
| CN | 104080305 | 10/2014 |
| CN | 104517772 | 4/2015 |
| CN | 105049966 | 11/2015 |
| CN | 204906680 | 12/2015 |
| CN | 105323674 | 2/2016 |

(56) References Cited

FOREIGN PATENT DOCUMENTS

| | | | | |
|---|---|---|---|---|
| CN | 205121173 | 3/2016 | | |
| CN | 105594225 | 5/2016 | | |
| CN | 206133514 | 4/2017 | | |
| CN | 206323698 | 7/2017 | | |
| CN | 107148810 | 9/2017 | | |
| CN | 109203623 | 1/2019 | | |
| CN | 110268242 A | * 9/2019 | ........... | A61B 5/1117 |
| EP | 0799747 | 10/1997 | | |
| EP | 0899634 | 7/2003 | | |
| EP | 2326106 | 5/2011 | | |
| EP | 2640042 | 9/2013 | | |
| JP | S5620399 | 2/1981 | | |
| JP | 200353872 | 2/2003 | | |
| JP | 200483811 | 3/2004 | | |
| JP | 2004235724 | 8/2004 | | |
| JP | 2004244607 | 9/2004 | | |
| JP | 2011187298 | 9/2011 | | |
| JP | 2012253426 | 12/2012 | | |
| JP | 2014013735 | 1/2014 | | |
| JP | 2014200024 | 10/2014 | | |
| JP | 2016022415 | 2/2016 | | |
| WO | WO 12/117738 | 9/2012 | | |
| WO | WO2012/117476 | 9/2012 | | |
| WO | WO2015/167848 | 11/2015 | | |
| WO | WO 18/146027 | 8/2018 | | |

OTHER PUBLICATIONS

Author Unknown, "What to Do when Gadgets Get Wet," http://gadgetshow.channel15.com/gadget-show/blog/what-to-do-when-gadgets-get-wet, 2 pages, Aug. 23, 2010.

* cited by examiner

PRESSURE-SENSING SYSTEM FOR A WEARABLE ELECTRONIC DEVICE

CROSS-REFERENCE TO RELATED APPLICATION(S)

This application is a non-provisional application that claims priority to U.S. Provisional Patent Application No. 62/904,385, filed Sep. 23, 2019 and titled "Pressure-Sensing System for a Wearable Electronic Device," the disclosure of which is hereby incorporated herein by reference in its entirety.

FIELD

Embodiments described herein relate generally to electronic devices incorporating pressure sensors, and more particularly to wearable devices like electronic watches having a pressure-sensing system.

BACKGROUND

Portable communications devices (e.g., smart phones and smart watches) are typically carried with the user throughout the day and may include various sensors that measure environmental conditions. However, because portable communication devices are subjected to a variety of operating conditions, the accuracy and reliability of some traditional sensing systems may vary over time and may depend on the operating conditions of the device. The systems and techniques described herein are directed to a pressure-sensing system that may have improved accuracy and/or reliability with respect to some traditional sensor systems.

SUMMARY

One embodiment described herein takes the form of a wearable electronic device including a housing comprising an internal wall separating a first internal chamber from a second internal chamber and an outer shell defining an audio port that connects the second internal chamber to an external environment. The wearable electronic device may also include a membrane positioned at an opening defined in the internal wall and configured to equalize a first pressure within the first internal chamber with respect to a second pressure of the external environment; a first pressure-sensing device positioned in the first internal chamber and configured to produce a first output; a second pressure-sensing device positioned in the second internal chamber and configured to produce a second output; and a processing unit operatively coupled to the first and second pressure-sensing devices. The processing unit is configured to determine an estimated pressure of the external environment using the second output in accordance with a determination that an accuracy condition satisfies a criteria, and determine the estimated pressure of the external environment using the first output in accordance with a determination that an accuracy condition does not satisfy a criteria.

Another embodiment described herein takes the form of an electronic device including a housing defining a first internal chamber and a second internal chamber coupled to an external environment by a port. The electronic device may also include an air-permeable membrane configured to equalize a first pressure of the first internal chamber with a second pressure of the external environment; a first pressure-sensing device positioned in the first internal chamber and configured to produce a first output; a second pressure-sensing device positioned in the second internal chamber and configured to produce a second output; and a processing unit operatively coupled to the first and second pressure-sensing devices. The processing unit is configured to determine an estimated pressure of the external environment using the second output, detect a change in a monitored condition of the second pressure-sensing device, and determine the estimated pressure of the estimated pressure using the first output in accordance with a determination that the change exceeds a threshold.

Still another embodiment described herein includes operating a wearable electronic device including receiving a first output from an internal pressure-sensing device located inside a sealed internal chamber of the electronic device; receiving a second output from an external pressure-sensing device located outside the sealed internal chamber of the electronic device; determining an estimated pressure of an external environment using the second output; comparing the second output to the first output; determining an accuracy condition based on the comparison of the second output to the first output and determining a pressure measurement using the second output in response to the accuracy condition satisfying a criteria.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1A:
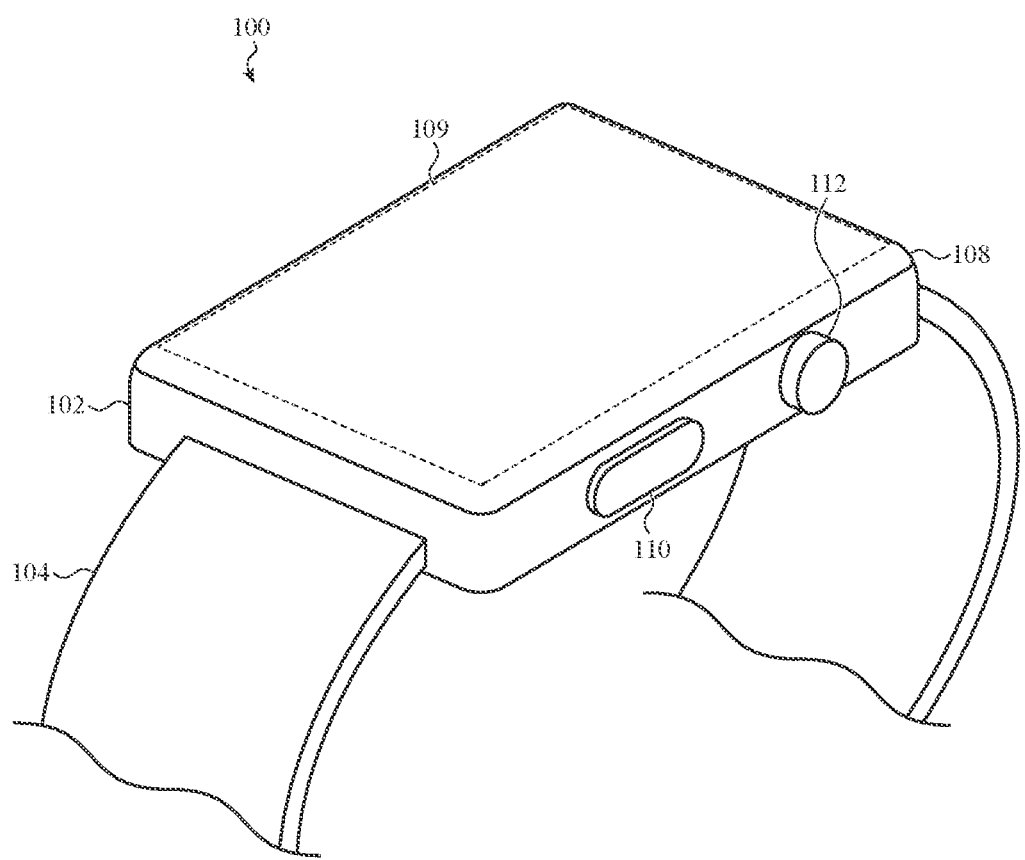
FIG. 1A is a first view of a sample electronic device incorporating internal and external pressure-sensing devices.

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block diagram form in order to avoid obscuring the concepts of the subject technology.

As described herein, an electronic device, like a portable and/or wearable electronic device may be equipped with a pressure-sensing system. The pressure-sensing system may be implemented on a smart watch or smart phone and used to measure pressure and determine other parameters from that pressure measurement, including elevation, vertical location within a building (e.g., floor), velocity, direction of motion, barometer, air pressure, and so on. Unlike some traditional sensing systems in which an output from pressure sensors may become less reliable over time (e.g., drift) or become less accurate when exposed to wet conditions, the pressure-sensing systems described herein may improve the reliability and/or accuracy of pressure-sensing measurements.

Embodiments described herein are generally directed to electronic devices incorporating a pressure-sensing system having two or more pressure-sensing devices. Such a pressure-sensing system may be incorporated into electronic smart watches, mobile phones, tablet computing devices, laptop computing devices, personal digital assistants, digital media players, wearable devices (including glasses, jewelry, clothing and the like) to measure environmental and/or internal pressures of the incorporating electronic device. Output from the pressure-sensing system may be used to determine the devices elevation, velocity, direction of motion, orientation, and so on. For example, a pressure-sensing device may make barometric pressure measurements to determine which floor a device is located on within a building or how may flights of stairs (up or down) that the electronic device has traveled. In some cases, pressure measurements from one or more pressure-sensing devices may be used in conjunction with other data such as global position system (GPS) information, force sensor measurements, moisture measurements, temperature measurements, or the like. The pressure-sensing devices (and any pressure-sensing devices described with respect to any embodiment) may include a piezoresistive, capacitive, optical, optoelectronic, potentiometric, or other suitable pressure sensor.

As described herein, a pressure-sensing system may include multiple pressure-sensing devices that are positioned within different chambers or internal volumes of the electronic device. One pressure-sensing device may be located in a sealed volume or first internal chamber of the electronic device and another pressure-sensing device may be located in a vented or open volume or second internal chamber of the device. The pressure-sensing devices may be used to improve the overall accuracy and reliability of pressure-sensing measurements in a variety of conditions and use cases.

In some cases, the pressure-sensing system may include a first pressure-sensing device located within a sealed internal chamber of a housing of the device. The sealed internal chamber may include one or more membranes that prevents water, dust and/or other contaminants from entering the sealed housing. Air may pass through the membrane thereby equalizing the internal pressure of the sealed internal chamber with a pressure of and external environment. This internal pressure-sensing device is protected from moisture and contaminants, which helps maintain accurate pressure measurements over the life of the device and in a variety of operating environments. However, the membrane may restrict the free movement of air into and out of the sealed internal chamber which may slow down pressure equalization between the internal volume of the sealed chamber and an external environment as compared to if the pressure sensor was directly exposed to the external environment (e.g., no membrane between the internal pressure sensing-device and external environment). In some cases, pressure measurements taken by an internal pressure-sensing device may lag behind the actual external pressure due to the membrane. Accordingly, an internal pressure-sensing device may produce a more reliable pressure measurement when the electronic device is maintained at a constant external pressure (e.g., altitude) for a duration of time.

In some cases, the pressure-sensing system may include a pressure-sensing device located within a second unsealed internal chamber of a housing of the device. The second unsealed internal chamber may be coupled with an external environment (e.g., exposed to the atmosphere) via a port that is defined by an outer shell of the housing. For example, the external pressure-sensing device may be located in a speaker chamber of an electronic device and the outer shell of the electronic device includes an audio port that is open to the external environment. The audio port may connect the unsealed internal chamber to the external environment may allow the external pressure-sensing device to measure a pressure of the external environment with little to no lag to obtain instantaneous (or near instantaneous) barometric pressure measurements. In some cases, the port may expose the external pressure-sensing device to one or more changing environmental conditions such as moisture, dust, debris, or other contamination. To protect components of the external pressure-sensing device (e.g., pressure sensor, electrical connectors, or the like) one or more portions of the device (e.g., pressure sensor) may include a protective coating. For example, a pressure transducer and/or other electrical components of the external pressure-sensing device exposed to the external environment may be encased in a gel, polymer, rubber, or other suitable material. Exposing the external pressure-sensing device and/or protective coating to moisture (e.g., electronic device is submerged) may affect the accuracy of barometric pressure measurements. In some cases, the protective gel may need to dry for a period of time before the external pressure-sensing device produces accurate (within a defined threshold, tolerance or the like) pressure measurements. Accordingly, the external pressure sensor may provide instantaneous or near instantaneous pressure measurements, but may be affected by environmental condition such as moisture.

As described herein, the pressure-sensing system may include both an internal pressure-sensing device and an external pressure-sensing device. Operation of the internal and external pressure-sensing devices may be coordinated based on one or more monitored conditions of the electronic device and/or an output from one or both of the pressure-sensing devices. In one non-limiting example, an electronic device may default to using outputs from one of the pressure-sensing devices (e.g., the external pressure-sensing device) to determine or estimate an environmental pressure. For example, under normal operating conditions (e.g., when the external pressure-sensing device is dry and/or operating within specified parameters such as below a defined moisture level) the external pressure-sensing device may provide real-time (or near real-time) pressure measurements due to its direct exposure to the external environment as compared to the internal pressure-sensing device, which may have a time lag due to sealed housing equalizing via the membrane. Accordingly, the electronic device may default to using output signals received from the external pressure-sensing device for one or more operations, such as determining an altitude of the electronic device.

In some cases, the electronic device may monitor one or more conditions, such as whether the external pressure-sensing device has been exposed to moisture. In some cases, the electronic device uses pressure signals from a different pressure-sensing device (e.g., the internal pressure-sensing device) or to determine an environmental pressure, or determine when the external pressure-sensing device has dried sufficiently. For example, an electronic device may initially determine an environmental pressure using the external pressure-sensing device. Subsequently, the electronic device may determine that the external pressure-sensing device has been exposed to moisture and switch to using pressure signals from the internal pressure-sensing device while the external pressure-sensing device dries. In some examples, the electronic device may wait a defined period of time and then switch back to using the external pressure-sensing device. In other examples, the electronic device may monitor a moisture parameter (e.g., moisture level associated with the external pressure-sensing device) to determine when to switch back to using the external pressure monitor.

In some cases, an electronic device may use one pressure-sensing device to monitor and/or calibrate a second pressure-sensing device. For example, external pressure-sensing device may drift or lose calibration over time due to dust, debris, other contamination, degradation of a protective coating, or other exposure to the external environment. Pressure signals from an internal pressure-sensing device may be used to re-calibrate or adjust a calibration of the external pressure-sensing device. In some examples, output from an external pressure-sensing device may be monitored and compared to output from an internal pressure-sensing device and the electronic device may use this comparison to determine whether a calibration procedure should be initiated. In some cases, if output of the external pressure-sensing device fails to meet an accuracy threshold based on measurements from the internal pressure-sensing device, the electronic device may determine that the external pressure-sensing device should be calibrated. In some examples, the electronic device may determine whether the device is anticipated to be at a constant pressure state (e.g., device is sleeping and measured pressures are not changing) to minimize any latency associated with the internal pressure-sensing device (e.g., due to pressure equalization of the internal chamber).

Figure 1B:
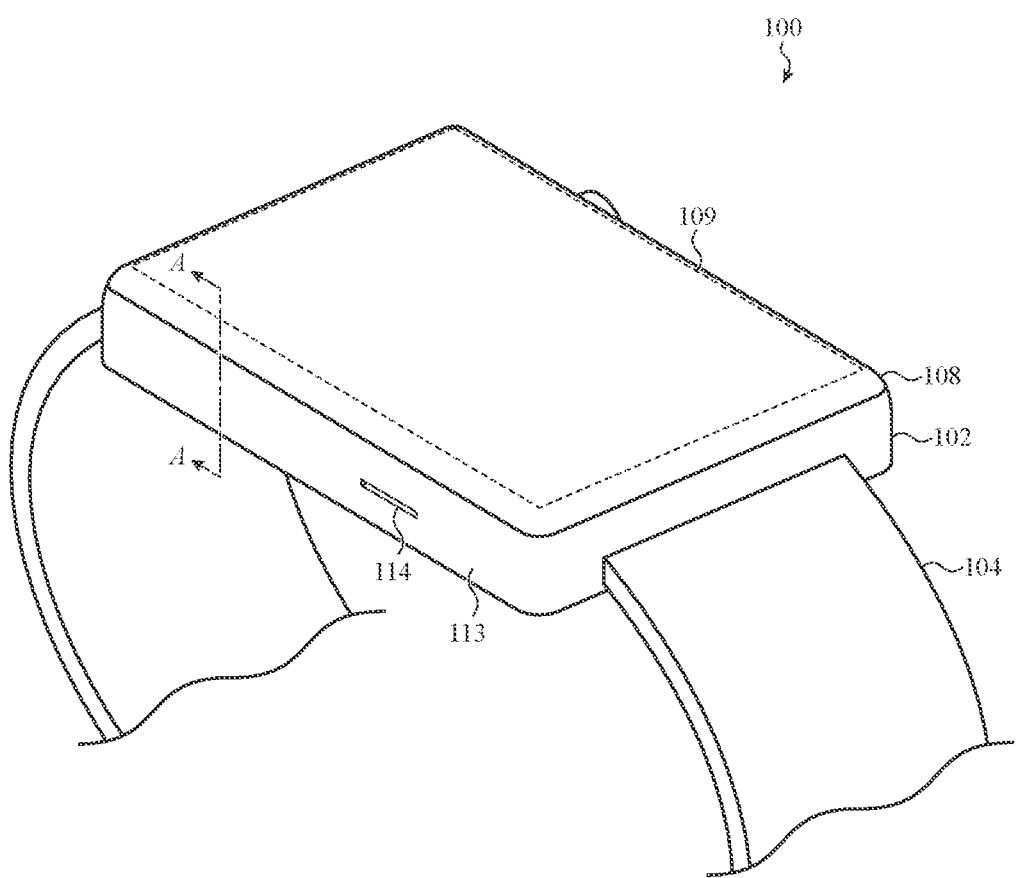
FIG. 1B is a second view of a sample electronic device incorporating internal and external pressure-sensing devices.

FIGS. 1A-1B depict a sample electronic device 100. The electronic device 100 is depicted as an electronic watch (e.g., a smart watch), though this is one example embodiment of an electronic device and the concepts discussed herein may apply equally or by analogy to other electronic devices, including mobile phones (e.g., smartphones), tablet computers, notebook computers, notebook computers, head-mounted displays, digital media players (e.g., mp3 players), health-monitoring devices, or the like. The electronic device 100 may incorporate two or more pressure-sensing devices, as described herein.

The electronic device 100 may be worn by a user and include one or more sensors that determine or estimate a condition of the user (e.g., body temperature, heart rate, position, direction of movement or the like) and/or an environmental condition (e.g., air temperature, barometric pressure, moisture level, and so on), which may be displayed or presented to the user. Different sensors may be positioned at different locations on or within the electronic device 100 depending on operating requirements of a particular sensor, the condition being detected by the sensor, the design of the electronic device 100, and so on. In some cases, it may be desirable for the electronic device to quickly and accurately determine a barometric pressure associated with a user of the device. For example, if trying to locate a user of the device in an emergency situation, pressure data may be used to determine an altitude location (e.g., which floor the user is located on) within a building. In further examples, it may be desirable for a wearable electronic device to track activity of a user (e.g., steps taken or distance covered), locate a user's position, generate a heat map of places the user has visited, and so on, which may all produce results that are displayed to the user on the display of the device. Some of these measurements may be time-sensitive (e.g., occur real-time sensor information) and subject the devise to a variety of conditions (e.g., water, changes in altitude, changes in temperature, etc.). Accordingly, the electronic device may include a pressure-sensing system with a first external pressure-sensing device that is directly exposed to an external environment and a second internal pressure-sensing device that is positioned in an internal chamber of the device.

In some cases, an external pressure-sensing device may be exposed to one or more environmental conditions that affect the reliability or accuracy of its pressure outputs. For example, if the external pressure-sensing device becomes wet, its pressure outputs may not satisfy an accuracy threshold until the device has dried a sufficient amount. In further examples, dust, debris, other contaminants, degradation of a protective coating, or the like may cause pressure measurements of the external pressure-sensing device to drift/change over time. Accordingly, the electronic device may include an internal pressure-sensing device that is isolated from an external environment by an air-permeable membrane. In some examples, the internal pressure-sensing device may be used by the electronic device 100 to estimate an environmental pressure when the outputs from the external pressure sensor may not provide accurate pressure data (e.g., the external sensor is wet). In further examples, the internal pressure sensor may be used to monitor the outputs from the external pressure sensor to determine whether the external pressure sensor is functioning within one or more defined thresholds or should be calibrated.

The electronic device 100 may include a housing 102 and a band 104 coupled to the housing 102. The band may be configured to couple the electronic device 100 to a user, such as to the user's arm or wrist. A portion of the band 104 may be received in a channel that extends along an internal side of the housing 102, as described herein. The band 104 may be secured to the housing 102 within the channel to maintain the band 104 to the housing 102.

The electronic device 100 also includes a transparent cover 108 (which may be referred to simply as a "cover") coupled with the housing 102 and positioned over the display 109. The cover 108 and the housing 102 along with other components may form a sealed internal volume of the electronic device 100, which may contain the internal pressure-sensing device along with other electrical components of the electronic device 100. In some cases, the cover 108 defines substantially the entire front face and/or front surface of the electronic device 100. The cover 108 may also define an input surface of the electronic device 100. For example, as described herein, the electronic device 100 may include touch and/or force sensors that detect inputs applied to the cover 108. The cover 108 may be formed from or include glass, sapphire, a polymer, a dielectric, or any other suitable material.

A display 109 may be positioned under the cover 108 and at least partially within the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid-crystal display (LCD), organic light emitting diode display (OLED), or any other suitable components or display technology. In some cases, the display 109 may output a graphical user interface with one or more graphical objects that display information collected from or derived from the pressure-sensing system. For example, the display 109 may output a current barometric pressure associated with the electronic device 100 or estimated altitude of the electronic device.

The display 109 may include or be associated with touch sensors and/or force sensors that extend along the output region of the display and which may use any suitable sensing elements and/or sensing techniques. Using touch sensors, the electronic device 100 may detect touch inputs applied to the cover 108, including detecting locations of touch inputs, motions of touch inputs (e.g., the speed, direction, or other parameters a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multiple finger inputs, single- or multiple-finger touch gestures, presses, and the like. Touch and/or force sensors usable with wearable electronic devices, such as the device 100, are described below.

The electronic device 100 may also include a crown 112 having a cap, protruding portion, or component(s) or feature(s) (collectively referred to herein as a "body") positioned along a side surface of the housing 102. At least a portion of the crown 112 (such as the body) may protrude form, or otherwise be located outside, the housing 102, and may define a generally circular shape or circular exterior surface. The exterior surface of the body of the crown 112 may be textured, knurled, grooved, or otherwise have features that may improve the tactile feel of the crown 112 and/or facilitate rotation sensing.

The crown 112 may facilitate a variety of potential interactions. For example, the crown 112 may be rotated by a user (e.g., the crown may receive rotational inputs). Rotational inputs of the crown 112 may zoom, scroll, rotate, or otherwise manipulate a user interface or other object displayed on the display 109 (among other possible functions). The crown 112 may also be translated or pressed (e.g., axially) by the user. Translational or axial inputs may select highlighted objects or icons, cause a user interface to return to a previous menu or display, or activate or deactivate functions (among other possible functions). In some cases, the device 100 may sense touch inputs or gestures applied to the crown 112, such as a finger sliding along the body of the crown 112 (which may occur when the crown 112 is configured to not rotate) or a finger touching the body of the crown 112. In such cases, sliding gestures may cause operations similar to the rotational inputs, and touches on an end face may cause operations similar to the translational inputs. As used herein, rotational inputs include both rotational movements of the crown (e.g., where the crown is free to rotate), as well as sliding inputs that are produced when a user slides a finger or object along the surface of a crown in a manner that resembles a rotation (e.g., where the crown is fixed and/or does not freely rotate). In some embodiments, rotating, translating, or otherwise moving the crown 112 initiates a pressure measurement by a pressure-sensing system (such as an external and/or internal pressure-sensing device) located on or within the electronic device 100. In some cases, selecting an activity, requesting a location, specific movements of the user, and so on may also initiate pressure measurements by the pressures-sensing system.

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

FIG. 1B depicts another view of the electronic device 100. As shown, the housing 102 may include an outer shell 113, which may define one or more exterior side surfaces of the housing 102 (and thus of the electronic device 100). In some cases, the outer shell 113 extends around the entire periphery of the device. As described herein, the outer shell 113 may at least partially define an internal volume of the housing 102.

The outer shell 113 may define opening or port 114 (e.g., an audio port). While a single opening 114 is shown, the outer shell 113 may have more openings than shown, such as two opening, three, four, or more openings 114. Further, while the electronic device 100 shows the opening 114 in the outer shell 113, the opening may be positioned elsewhere, such as through a back or bottom wall of the device 100.

As described in more detail herein, at least one opening 114 may couple an external environment to an unsealed external chamber within the housing 102, in which components such as an external pressure-sensing device are positioned. In some cases the external chamber may be separated from a sealed internal chamber by one or more structures such as an internal wall, one or more membranes, speaker components, and so on. The openings 114 may allow air pressure equalization between the unsealed external chamber and the external environment around the device 100, thus allowing the external pressure-sensing device to achieve instantaneous (or near instantaneous) readings of the external air pressure.

In some embodiments, the opening 114 may also allow audio output from an internal speaker to exit the housing 102, such that audio output from the speaker can be heard by a wearer and/or other observers. In some cases, the opening 114 is completely open, with no screen, mesh, grate, or other component or material obstructing air flow between the first volume and external environment. In other cases, the opening 114 may be covered by a screen, mesh, grate, or other component or material, which may help reduce or prevent debris, dust, liquid, or other contaminants from entering the housing 102. The pressure-sensing system is described in more detail below with respect to FIGS. 2-7.

Figure 2:
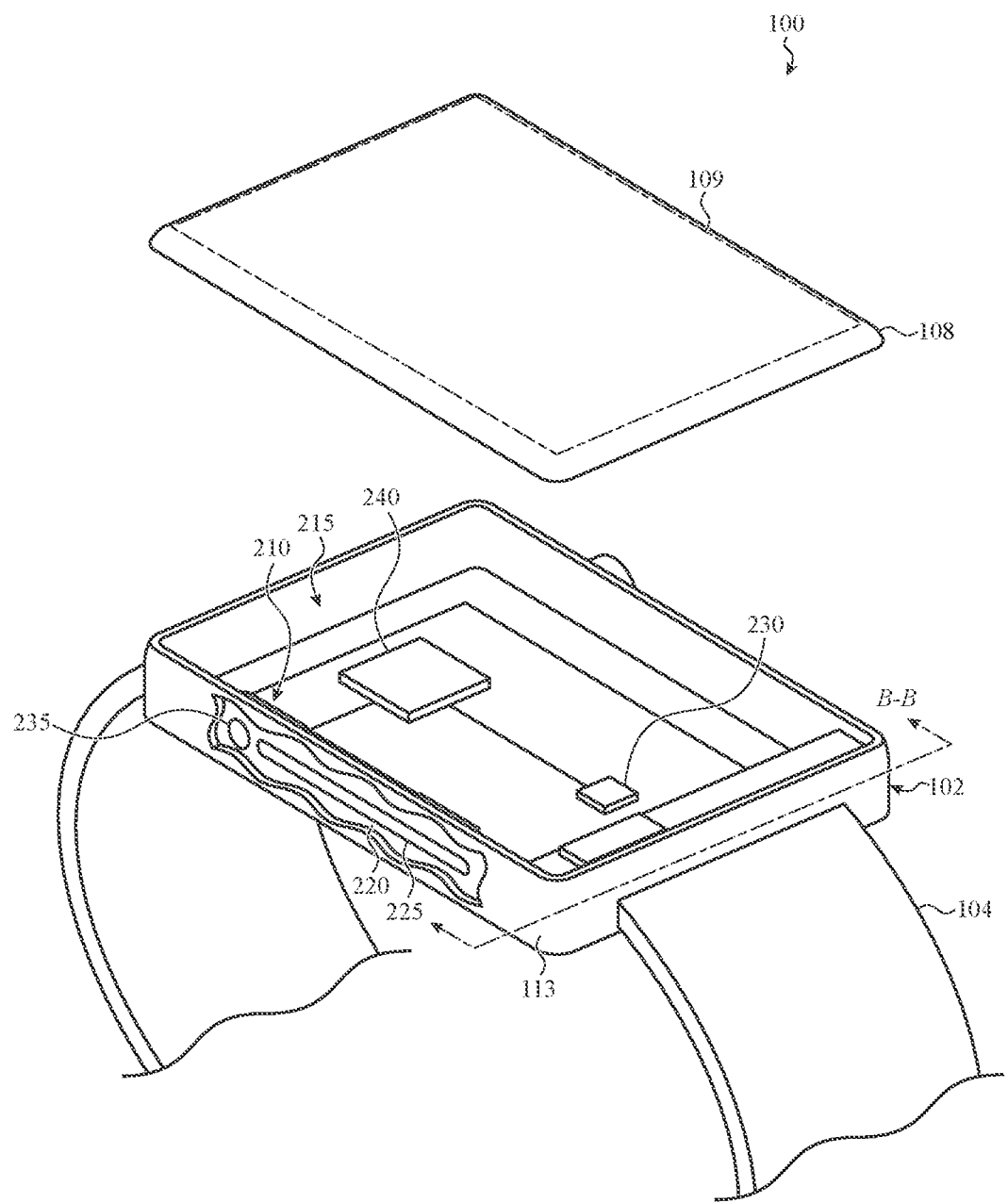
FIG. 2 is a third view illustrating internal structure of the of a sample electronic device incorporating internal and external pressure-sensing devices.

FIG. 2 is a broken-out view of the electronic device 100 with the cover 108, the display 109, and a portion of the outer shell 113 removed to illustrate one or more internal structures of the device 100. As shown in FIG. 2, the housing may include an internal wall 210 located within the outer shell 113. The internal wall 210 may divide an internal volume of the housing 102 and separate an internal chamber 215 and an exterior chamber 220 within the housing 102. The internal chamber 215 may be sealed and at least partially defined by an air-permeable membrane 225 located along the internal wall. The exterior chamber 215 may be partially defined by the outer shell 113, the internal wall 210, and the air-permeable membrane 225.

In some embodiments, the internal wall 210 may include an independent and/or removable structure that couples to the housing 102. For example, the internal wall 210 may include a frame/support structure that interfaces with the housing 103 (e.g., outer shell 113) and couples the internal wall to the housing 103 thereby separating the internal chamber 215 and exterior chamber 220. The internal wall 210 may include seals, gaskets, adhesives or the like that seal or hermetically isolate the internal chamber 215 from an external environment. The internal wall 210 may also include one or more components of a speaker system, the air-permeable membrane 225, an external pressure sensor 235 or the like as described herein. In some cases, the internal wall 210 may locate some components such as the external pressure sensor 235 within the external chamber 220 (where it is exposed to an external environment) while locating other components such as circuit boards, electrical connectors, flex cables, or the like within the internal chamber 215 (where they are isolated from an external environment). The internal wall 210 may be coupled to the outer shell 113 in a variety of ways including via fasteners (e.g., threaded fasteners, clips, snap connections, or other mechanical coupling structures), adhesives, soldering and/or other welding techniques, or other suitable attachments techniques.

The internal chamber 215 may include a sealed volume that is at least partially defined by a portion of the outer shell 113, the cover 108, a bottom surface (not shown) and the internal wall 210. The internal wall 210 may include an opening that houses the air-permeable membrane 225, which may prevent water, dust, debris, or other contaminates from entering the internal chamber 215. The air-permeable membrane 225 may allow air to effuse, diffuse, and/or otherwise move into and out of the internal chamber 215 thereby equalizing a pressure within the internal chamber 225 with a pressure of the external environment. In some embodiments, the air-permeable membrane may be formed from a polymer, rubber, silicone rubber, or any other suitable material. In some cases, the air-permeable membrane may include materials such as polytetrafluoroethylene (PTFE), expanded PTFE (ePTFE), or the like. The air-permeable membrane 225 may resist and/or slowdown the passage of air molecules moving between the internal chamber 215 and an external environment thus, increasing a time/duration for the internal chamber 215 to equalize with the external environment (that is, compared to if the internal volume was directly coupled, such as including an open passage, to the external environment).

An internal pressure-sensing device 230 is positioned within the sealed internal chamber 215 of the housing 102. The internal pressure-sensing device 230 may detect the pressure of the internal chamber 215 and produce a first output (e.g., electrical signal) based on a response of the internal pressure-sensing device 230 to the environmental pressure of the internal chamber 215. Thus, the internal pressure-sensing device 230 may estimate a pressure of the external environment (insofar is the pressure of internal chamber 215 has equalized with the pressure of the external environment). In some cases, the pressure of the internal chamber detected by internal pressure-sensing device 230 may lag behind the actual external pressure by the duration it takes air to effuse and/or diffuse across the air-permeable membrane 225. In some embodiments the internal pressure-sensing device 230 is directly coupled to the housing 102, while in other embodiments the internal pressure-sensing device 230 is coupled to a substrate that is directly or indirectly coupled to the housing 102. The substrate may be a circuit board, support, strut, projection, or other structure.

The internal pressure-sensing device 230 may include a piezo-resistive barometric pressure sensor such as a silicon micro machined device that mounts to a circuit board. In some embodiments the internal pressure-sensing device 230 may include a microelectromechanical (MEMs) sensor, a capacitive sensor, a fluid based sensor, or the like or any combination thereof.

The external chamber 220 may include a second unsealed volume that is at least partially defined by a portion of the sidewall 113, the internal wall 210, and the outer shell 205. The opening(s) 114 in the outer shell 205 may directly couple the exterior chamber 220 to the exterior environment. That is, the net area of the opening(s) 114 (e.g., combined area of the one or more openings 114) are of sufficient size to allow instantaneous or near instantaneous pressure equalization between the exterior chamber 220 and an exterior environment. In some cases, the openings 114 may allow water and other environmental matter (e.g., dust, or other particles or contaminants) to enter and/or exit the exterior chamber 220.

An external pressure-sensing device 235 is positioned within the exterior chamber 220 of the housing 102. The external pressure-sensing device 235 may detect the pressure of the exterior chamber 220, and produce a second output (e.g., electrical signal) based on a response of the external pressure-sensing device 235 to the environmental pressure in the external chamber 220. Thus, the external pressure-sensing device 235 may estimate a pressure of the external environment (insofar as the exterior chamber 220 and the external environment are coupled by the opening 114 and the sensor is dry and free of debris). In some embodiments the external pressure-sensing device 235 may be coupled to the internal wall 210. In some examples this may include directly coupling the external pressure-sensing device 235 to the internal wall 210, while in other embodiments the external pressure-sensing device 235 is coupled to a substrate that is directly or indirectly coupled to the internal wall 210. The substrate may be a circuit board, support, strut, projection, or other structure.

The external pressure-sensing device 235 may include a piezo-resistive barometric pressure sensor such as a silicon micro machined device that mounts to a circuit board. In some embodiments the external pressure-sensing device 235 may include a microelectromechanical (MEMs) sensor, a capacitive sensor, a fluid based sensor, or the like or any combination thereof.

In some embodiments, the external pressure-sensing device 235 and a speaker of the electronic device 100 may both be located in the external chamber 220. This may include both the external pressure-sensing device 235 and the one or more components of the speaker being mounted on the internal wall 210. In some cases, the air-permeable membrane 225 may be integrated with the internal wall 210 and/or the speaker of the electronic device 100. In some embodiments the external pressure-sensing device 235 may be located in a separate external chamber from the speaker and/or the air-permeable membrane 225. For example, the external pressure-sensing device 235 may be located in a second external chamber that is different from the speaker and is coupled with the external environment (e.g., via one or more openings as described herein).

A processing unit 240 may also be located in the internal chamber 215 of the housing 102. The processing unit 240 may be electrically coupled with the internal pressure-sensing device 230 and the external pressure-sensing device 235. The processing unit 240 may be configured to receive one or more outputs from the pressure-sensing devices 230, 235. In some cases, the processing unit 240 may receive an electrical signal from one or more of the pressure-sensing devices 230, 235 that is indicative of an environmental pressure (e.g., barometric pressure). The processing unit 240 may be configured to determine the device's 100 elevation, velocity, direction of motion, orientation, and so on based on the received electrical signal(s).

The processing unit 240 may coordinate operation of the pressure-sensing devices 230, 235 based on outputs received from one or more sensors (e.g., moisture sensor) including the pressure-sensing devices 230, 235 themselves, as described herein.

A battery and other electronic components may also be located in the internal chamber 215 of the housing 102. Electronic components may include one or more processing units, sensors, output devices, memory, storage devices, displays, audio devices (including speakers and microphones), and so on, specifically including components discussed below with reference to FIG. 6. Generally, the battery and other electrical components 220 occupy a majority of the internal volume 230. In some embodiments, a substrate may electrically couple the pressure-sensing devices 230, 235 to the battery, the processing unit 240 and/or other components. The substrate may route power to the pressure-sensing devices 230, 235, route an output of the pressure-sensing devices 230, 235 to the processing unit 240 and/or other electronic components 220, and so on. Thus, the substrate may serve both as a support for the pressure-sensing devices 230, 235 and an electrical path between the pressure-sensing devices 230, 235 and other components.

The electronic device 100 also includes a display 109 (shown in FIG. 1) at least partially within the internal volume of the housing 102 and protected by the cover 108 (shown in FIG. 1). Typically, the display 109 is configured to display information that may include the pressure sensed by one or more of the pressure-sensing devices 230, 235. In some embodiments, the processing unit 240 may use the output of one or more of the pressure-sensing devices 230, 235 to modify information shown on the display 109 or an operation of the electronic device 100.

As described herein, the electronic device may also include a crown 112 (shown in FIG. 1A) extending from the housing 102. Rotating and/or translating the crown 112 with respect to the housing 102 may initiate and input to the electronic device 100. For example, rotating and/or translating the crown 112 may cause one or more of the pressure-sensing devices 230, 235 to measure a pressure of the internal chamber 215 and/or the external chamber 220. Rotating and/or translating the crown 112 may also cause the measured pressure, elevation or parameter to be shown on display 109, for example by instructing the processing unit to change information shown on the display.

Figure 3:
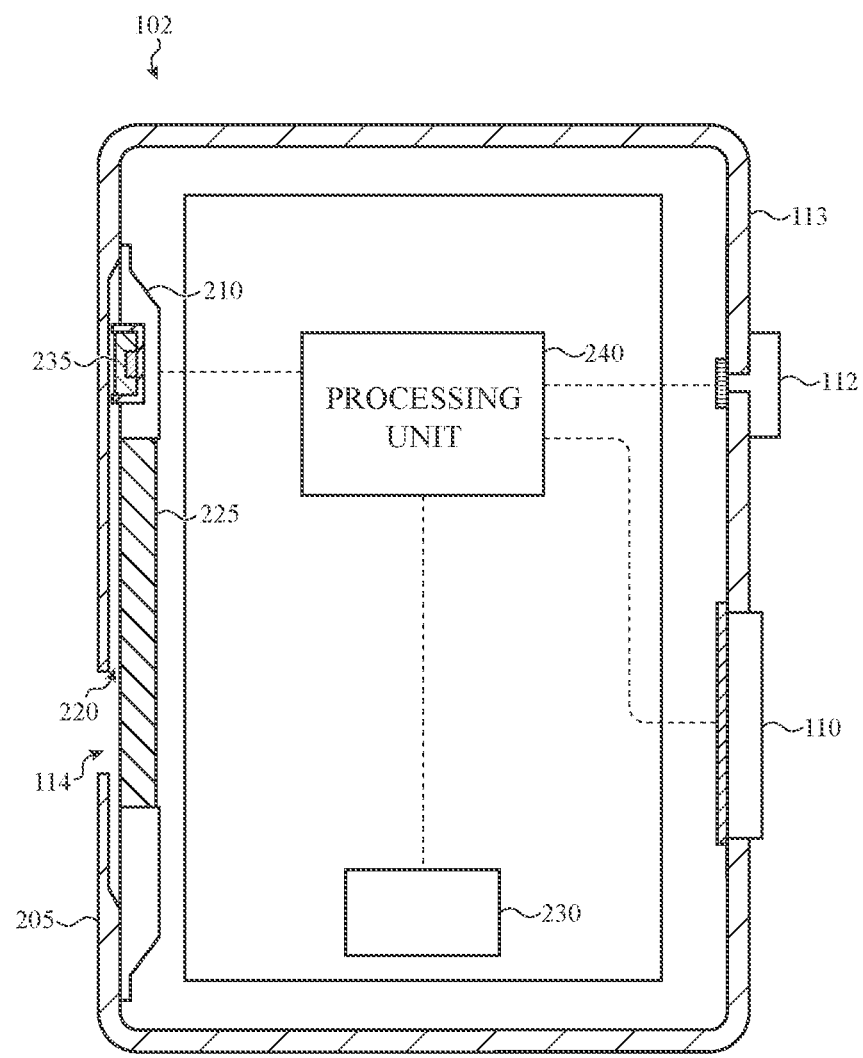
FIG. 3 is a cross-section view of a sample electronic device incorporating internal and external pressure-sensing devices.

FIG. 3 is a cross-section view of the electronic device 100, taken along line B-B of FIG. 2. As shown in FIG. 3, the outer shell 113 partially defines an internal volume of the electronic device 100 and the internal wall 210 further defines a sealed internal chamber 215 and an unsealed external chamber 220. Thus, the external pressure-sensing device 235 may be directly coupled with an external environment and instantly (or near instantly) detect a pressure of the external atmosphere. Additionally, a pressure of the sealed internal chamber 215 may equalize with the external atmosphere over time via the air-permeable membrane 235, and the internal pressure-sensing device may indirectly measure a pressure of the external environment (by measuring the pressure within the internal chamber 215) over longer time durations.

The opening(s) 114 coupling the external chamber 220 with an external environment may expose the external pressure-sensing device 235 to one or more environmental conditions such as water, dust, debris, other contaminants, or the like. The external pressure-sensing device 235 may become less accurate when exposed to an environmental conditions such as water. For example, water may coat and/or hydrate an outer surface of the external pressure-sensing device 235 causing the sensor to output less accurate pressure signals.

The electronic device 100 may be configured to monitor one or more accuracy conditions (which may also be referred to as a monitored condition) of the external pressure-sensing device 235 to determine whether a criteria is satisfied. If the accuracy condition (e.g., moisture level, difference between outputs of the first and second pressure-sensing devices, calibration offset, and so on) satisfies a criteria (e.g., threshold, determination that the second pressure-sensing device is wet, and so on), the processing unit 240 may determine an estimated pressure of the external environment using the output from the external pressure-sensing device 235. If the accuracy conditions does not satisfy the criteria, the processing unit 240 may determine an estimate pressure of the external environment using output from the internal pressure-sensing device 230. For example, the processing unit 240 may monitor a moisture level associated with the external pressure-sensing device 235. If a moisture level associated with the external pressure-sensing device 235 is below a threshold, the processing unit 240 may determine that the accuracy condition satisfies the criteria and determine an estimated pressure of the external environment using the output from the second pressure-sensing device 235. If the moisture level is above a threshold, the processing unit 240 may determine that the external pressure-sensing device is wet, and that the accuracy condition does not satisfy the criteria. In this case, the processing unit 240 may determine an estimated pressure of the external environment using the internal pressure-sensing device 230. The electronic device 100 may determine the moisture level in a variety of ways, including the use of a moisture sensor, based on output signals received from the external pressure-sensing device 235, a user input (e.g., indicating a water based activity), outputs from other sensors, and so on, or a combination thereof.

In additional embodiments, an accuracy condition may correspond to a calibration of the external pressure-sensing device 235, such as whether outputs from the external pressure-sensing device 235 have drifted. For example, the processing unit 240 may compare outputs from the external pressure-sensing device 235 with outputs from the internal pressure-sensing device 230 to determine whether an accuracy condition satisfies a criteria (e.g., calibration offset threshold). In some cases, this may include determining a difference between the respective outputs, and if the difference exceeds a threshold, the processing unit 240 may determine that the accuracy condition does not satisfy the criteria. In other examples, the processing unit 240 may compare the outputs from the external pressure-sensing device 235 with known values. For example, the electronic device may associate a location of the watch (e.g., GPS based location) with a known pressure for that location. Accordingly, when at that location, the processing unit 240 may compare an estimated pressure from the external pressure-sensing device 235 with the known pressure for that location to determine whether the accuracy condition satisfies the criteria.

In some cases, repeated exposure to environmental conditions such as moisture, dust, debris, other contaminants or the like may cause pressure output of the external pressure-sensing device 235 to drift and/or change over time, which may cause a criteria to not be satisfied (e.g., outputs from the external pressure-sensing device 235 to fail to meet a threshold). This may lead to inaccurate atmospheric pressure measurements, elevation determinations, and so on by the electronic device 100. However, pressure outputs from the internal pressure-sensing device 235 may be less susceptible to change over time because it is enclosed within the sealed internal chamber 215. Thus, the electronic device 100 may also use pressure outputs from the internal pressure-sensing device 230 to monitor, calibrate and/or adjust the pressure outputs from the external pressure-sensing device 235.

In some cases, current pressure signals from the external pressure-sensing device 235 may be compared with trends from prior pressure signals to evaluate whether the external pressure-sensing device is has been exposed to water or is otherwise not satisfying one or more thresholds. For example, if the external pressure-sensing device 235 becomes wet it may output random, semi-random, inaccurate, shifted or other characteristic pressure signals. In this regard, changes in the pressure signals outputted from the external pressure-sensing device 235 may be used to determine whether the device has been exposed to water. In some cases, this may include comparing a current pressure signal from the external pressure-sensing device 235 to one or more pressure trends established from previous signals from the external pressure-sensing device 235. For example, if pressure signals from the external pressure-sensing device 235 indicate that the device has been at the same pressure for a period of time (which may indicate that the device has not changed elevation) a sudden jump or spike in pressure, or random pressure readings may indicate that the external pressure-sensing device 235 has been exposed to water or other environmental condition that is effecting its pressure-sensing capabilities. In these examples, the processing unit 240 may determine that the accuracy condition does such as signals from the external pressure-sensing device 235 not satisfy a criteria such as a having pressure signals fall outside a threshold range.

In some cases, pressure outputs from the external pressure-sensing device 235 may be compared with pressure outputs from the internal pressure-sensing device 230 to evaluate whether the external pressure-sensing device is has been exposed to water or is otherwise not satisfying one or more thresholds. For example, the electronic device 100 (e.g., the processing unit 240) may compare the pressure signals from the external pressure-sensing device 235 with pressure signals from the internal pressure-sensing device 230 to evaluate whether the external pressure-sensing device 235 has been exposed to water or should be calibrated. In some cases, this may include determining whether an environmental pressure determined from the external pressure-sensing device 235 deviates by a defined amount from an environmental pressure determined from the internal pressure-sensing device 230 (e.g., difference between the respective pressure measurements exceeds a threshold). In further cases, the evaluation may include comparing variability in the external pressure-sensing device 235 signals with variability in the internal pressure-sensing device signals 230. For example, high variability (e.g., random or semi-random) external pressure signals and relatively steady internal pressure signals may indicate that the external pressure-sensing device 235 is wet or is otherwise not functioning within a threshold.

In some cases, the electronic device 100 may include an independent moisture sensor that may be used to make a determination that the external pressure-sensing device 235 is wet. For example, the processing unit 240 may receive signals from a moisture sensor located within the external chamber 220 to indicate if water is present in the external chamber 220. In some examples the moisture sensor may be a variable resistive sensor, capacitive sensor, or the like.

Due to a pressure lag between the internal chamber 215 and an external environment as described herein, the electronic device 100 may evaluate a stability condition when using pressure measurements from the internal pressure-sensing device 230. For example, the electronic device 100 may wait for the pressure signals from the internal and/or external pressure-sensing devices 230, 235 to stabilize before using the internal pressure-sensing signals to determine an environmental pressure or to evaluate outputs from the external pressure-sensing device 235. As another example, the electronic device 100 may be calibrated with or determine a lag between pressure measurements taken by the internal pressure-sensing device 230 and the external environment, and use this lag to associate measurements from the internal pressure-sensing device 230 with the external pressure and/or external pressure-sensing device 235.

The processing unit 240 may be coupled with both the external pressure-sensing device 235 and the internal pressure-sensing device 230. The processing unit 240 may be configured to receive an electrical signal from each of the internal and external pressure-sensing unit 230, 235 which is indicative of a pressure of the external environment. The processing unit 240 may also be configured to determine an absolute pressure, barometric pressure, elevation, altitude, velocity, direction of motion, location, and so on based on one or more pressure measurements received from either or both of the pressure-sensing devices 230, 235. In some cases, the processing unit 240 is also electrically coupled with a speaker, one or more other sensors such as moisture sensor(s), optical sensor(s), force sensor(s), and so on, outputs and/or inputs of which may be used in conjunction with one or more pressure measurements.

The electronic device 100 includes button 110 and crown 112, which may be used to initiate, respond to, or control one or more functions associated with the pressure-sensing devices. For example, in embodiments where the electronic device 100 is a watch, a user may wear the watch in the water. After exiting the water, a user may activate a water expulsion processes from the external chamber 220 by engaging with the button and/or crown 112. In response to the user input, the electronic device 100 may activate a speaker to expel water from the external chamber 220 via the opening 114. The water expulsion procedure may trigger a timer that indicates when the external pressure-sensing device 235 has dried sufficiently and may be used for pressure measurements. In some cases, the water expulsions procedure trigger by the button 110 or crown 112 input may initiate a sensing procedure in which the pressure outputs from the external pressure-sensing device 235 are monitored and evaluated (e.g., compared to pressure outputs from the internal pressure-sensing device) to determine when the external pressure-sensing device may be used again.

Figure 4:
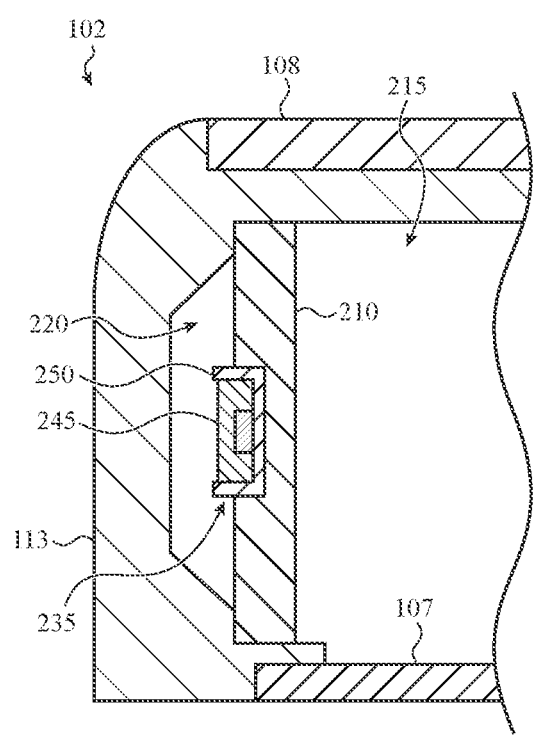
FIG. 4 illustrates an example external pressure-sensing device, in accordance with one or more embodiments.

FIG. 4 is a partial cross-section view of the electronic device 100, taken along line A-A of FIG. 1B. As shown in FIG. 4, the external pressure-sensing device 235 may be mounted on or coupled with the internal wall 210 and positioned within the exterior chamber 220. The outer shell 113 may cover or partially cover to external pressure sensor 235 to protect it from impacts and/or other physical disruption, while an opening in the outer shell 113 (e.g., opening 114 shown in FIG. 1B) may directly couple the external pressure sensor with the external environment. As such, water, dust, debris, other fluids, contaminants, and so on may enter and/or exit the external chamber 220 and contact the external pressure-sensing device 235.

The external pressure-sensing device 235 may include a sensing element 245 that outputs an electrical signal in response to an atmospheric pressure. In some cases the external pressure-sensing device 235 may include an encapsulant 250. The encapsulant 250 may cover the sensing element 245 along with one or more portions of an outer surface of the pressure-sensing device 245. For example, the encapsulant 250 may cover substantially the entire surface of the pressure-sensing device that is exposed to the exterior chamber 220. In some cases, the coating may form part of the water-resistant structure that prevents water from entering the internal chamber 215 of the electronic device 100. In some embodiment, the encapsulant 250 may be formed from a polymer material such a gel, an expoxy, silicone (e.g., silicone rubber) or other suitable material.

Over time one or more portions of the coating 250 may entrap dust, debris, or other contaminants. In some cases, wearing of the coating and/or trapping of different matter may shift or change an electrical output of the external pressure-sensing device 235. Changes or shifts in the output of the external pressure-sensing device 235 may be detected as described herein. For example, an accuracy condition of the external pressure-sensing devices 235 may be monitored and compared with an accuracy threshold. If the monitored accuracy condition of the external pressure-sensing device 235 fails to meet the accuracy threshold (exceeds or is below the threshold), then the electronic device 100 may switch to using the internal pressure-sensing device 230 and/or calibrate the external pressure-sensing device 235. For example, outputs from the internal pressure-sensing device 230 may be used to determine a calibration offset for the external pressure-sensing device 235. As a further example, a current pressure output of the external pressure-sensing device 235 may be compared with one or more previous outputs from the external pressure-sensing device 235 taken at the same or similar location. Accordingly, the electronic device 100 may determine whether a calibration procedure or other action (e.g., alerting the user, using the internal pressure-sensing device 230 as the default pressure monitor, or the like) should be taken in response to pressure outputs of the external pressure-sensing device 235 drifting or changing.

Figure 5A:
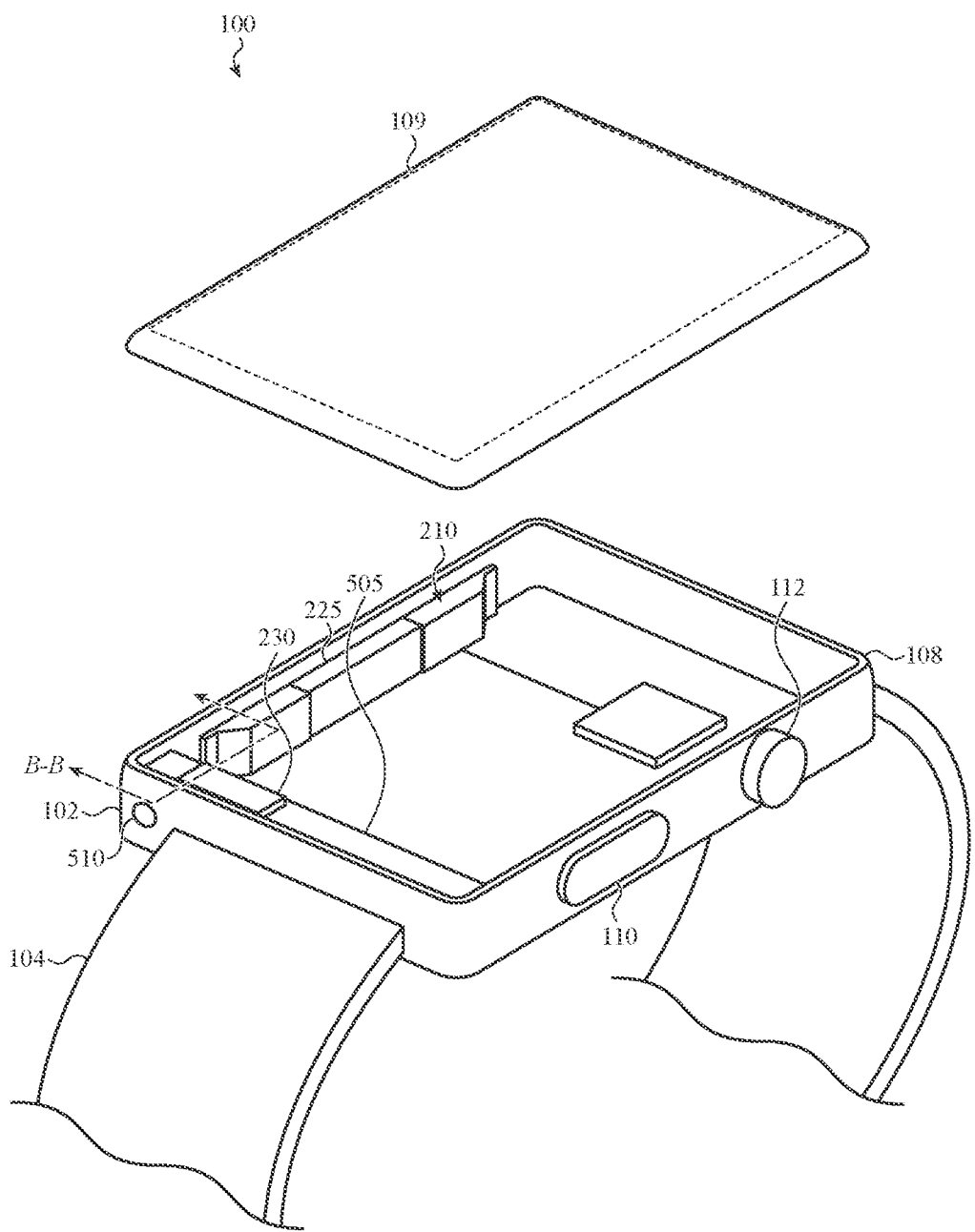
FIG. 5A is a first view of a sample electronic device incorporating internal and external pressure-sensing devices, in accordance with one or more embodiments.

FIG. 5A depicts another embodiment of the sample electronic device 100 with the cover 108 and display removed to illustrate internal components of the electronic device 100. In this embodiment, the pressure-sensing system may be positioned at an alternative location within the electronic device 100. For example, the internal pressure-sensing device 230 may be located on a shelf 505 within the sealed internal chamber 215 and the external pressure-sensing device 235 may be positioned within an independent unsealed internal chamber 520 (shown in FIG. 5B) that is coupled with the external environment via the port 510. In this embodiment, the external pressure-sensing device 235 may be located in an internal chamber 520 that is separate from a speaker and/or other components of the electronic device 100.

Figure 5B:
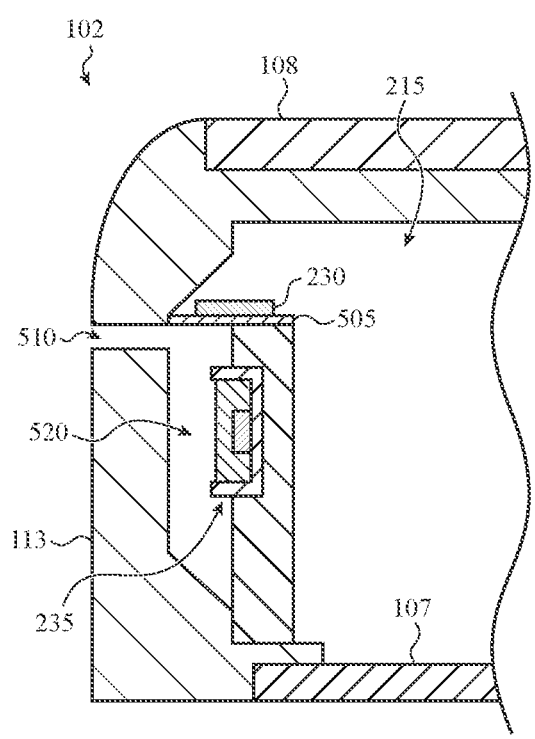
FIG. 5B is a second view of a sample electronic device incorporating internal and external pressure-sensing devices, in accordance with one or more embodiments.

FIG. 5B is a broken-out perspective view of the electronic device 100 of FIG. 5A along line B-B. As shown in FIG. 5B, the housing 102 may define a shelf 505 that may hold one or more components of the electronic device 100. In some cases, an internal pressure-sensing device 230 may be positioned on the shelf 505 within the sealed internal chamber 215 of the housing 102. The sealed internal chamber 215 may be also be separated from the external environment by the internal wall 210, which may include the air permeable membrane. In some cases, the internal pressure-sensing device 230 may be positioned at other locations within the internal volume and/or integrated with other electrical components, connectors, chips, or the like. The housing 102 may also at least partially define an unsealed internal chamber 520 and the external pressure-sensing device 235 may be positioned within the unsealed internal chamber 520. The port 510 may couple the unsealed internal chamber 520 with the external environment.

Figure 6:
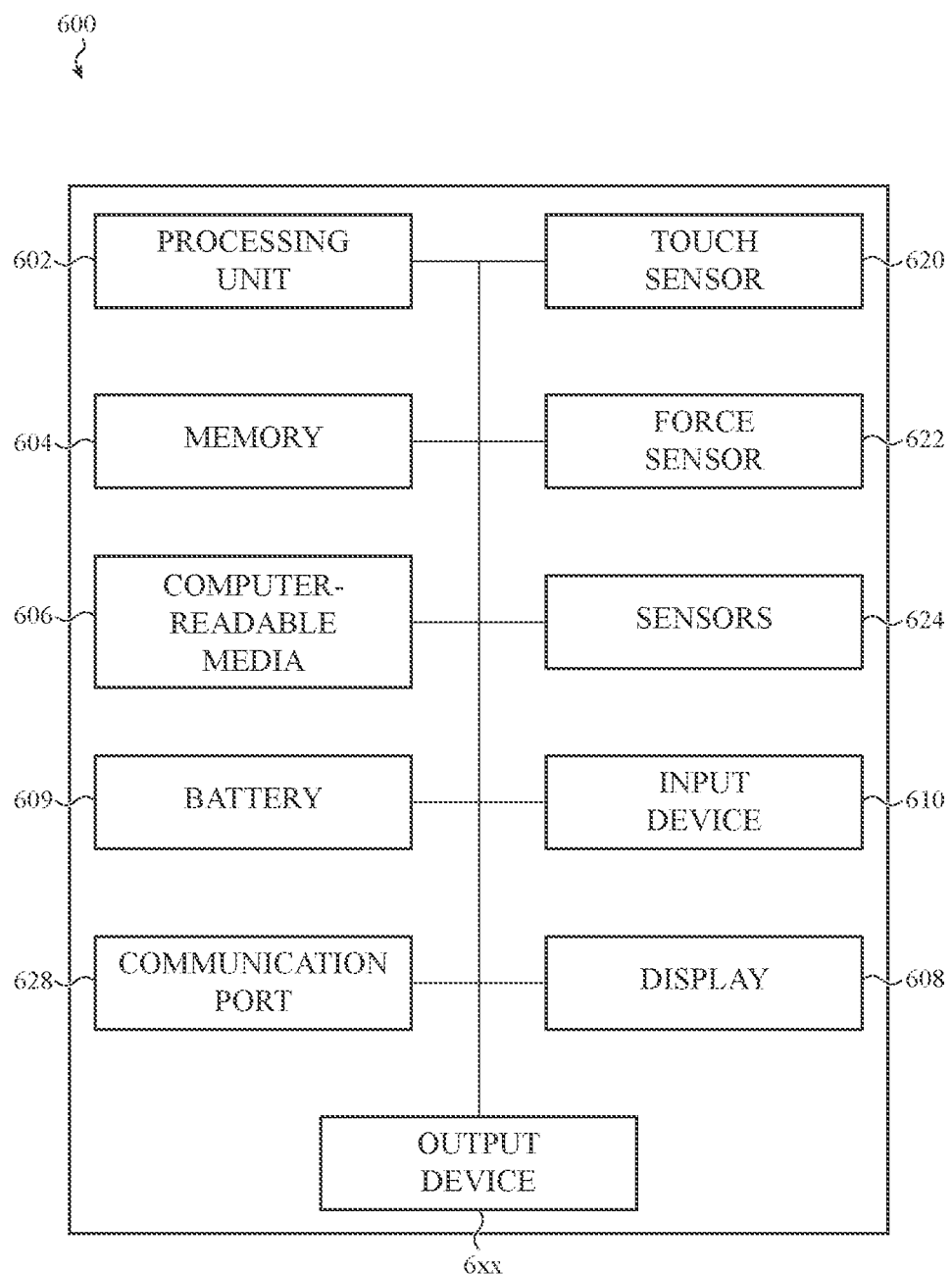
FIG. 6 is a block diagram illustrating an example wireless communication device, within which internal and external pressure-sensing devices can be integrated.

FIG. 6 depicts an example schematic diagram of an electronic device 600. By way of example, the device 600 of FIG. 6 may correspond to the wearable electronic device 100 shown in FIGS. 1A-5 (or any other wearable electronic device described herein). To the extent that multiple functionalities, operations, and structures are disclosed as being part of, incorporated into, or performed by the device 600, it should be understood that various embodiments may omit any or all such described functionalities, operations and structures. Thus, different embodiments of the device 600 may have some, none, or all of the various capabilities, apparatuses, physical features, modes, and operating parameters discussed herein.

As shown in FIG. 6, a device 600 includes a processing unit 602 operatively connected to computer memory 604 and/or computer-readable media 606. The processing unit 602 may be operatively connected to the memory 604 and computer-readable media 606 components via an electronic bus or bridge. The processing unit 602 may include one or more computer processing units or microcontrollers that are configured to perform operations in response to computer-readable instructions. The processing unit 602 may include the central processing unit (CPU) of the device. Additionally or alternatively, the processing unit 602 may include other processing units within the device including application specific integrated chips (ASIC) and other microcontroller devices.

In some embodiments the processing unit 602 may modify, change, or otherwise adjust operation of the electronic device in response to an output of one or more of the pressure-sensing devices, as described herein. For example, the processing unit 602 may shut off the electronic device 600 or suspend certain functions, like audio playback, if the pressure sensed by the pressure-sensing device exceeds a threshold. Likewise, the processing unit 602 may activate the device or certain functions if the sensed pressure drops below a threshold (which may or may not be the same threshold previously mentioned). As yet another option, the processing unit 602 may cause an alert to be displayed if pressure changes suddenly, as sensed by the pressure-sensing unit. This alert may indicate that a storm is imminent, a cabin or area has become depressurized, a port is blocked, and so on.

The memory 604 may include a variety of types of non-transitory computer-readable storage media, including, for example, read access memory (RAM), read-only memory (ROM), erasable programmable memory (e.g., EPROM and EEPROM), or flash memory. The memory 604 is configured to store computer-readable instructions, sensor values, and other persistent software elements. Computer-readable media 606 also includes a variety of types of non-transitory computer-readable storage media including, for example, a hard-drive storage device, a solid-state storage device, a portable magnetic storage device, or other similar device. The computer-readable media 606 may also be configured to store computer-readable instructions, sensor values, and other persistent software elements.

In this example, the processing unit 602 is operable to read computer-readable instructions stored on the memory 604 and/or computer-readable media 606. The computer-readable instructions may adapt the processing unit 602 to perform the operations or functions described above with respect to FIGS. 1A-6. In particular, the processing unit 602, the memory 604, and/or the computer-readable media 606 may be configured to cooperate with a sensor 624 (e.g., an image sensor that detects input gestures applied to an imaging surface of a crown) to control the operation of a device in response to an input applied to a crown of a device (e.g., the crown 112). The computer-readable instructions may be provided as a computer-program product, software application, or the like.

As shown in FIG. 6, the device 600 also includes a display 608. The display 608 may include a liquid-crystal display (LCD), organic light emitting diode (OLED) display, light emitting diode (LED) display, or the like. If the display 608 is an LCD, the display 608 may also include a backlight component that can be controlled to provide variable levels of display brightness. If the display 608 is an OLED or LED type display, the brightness of the display 608 may be controlled by modifying the electrical signals that are provided to display elements. The display 608 may correspond to any of the displays shown or described herein.

The device 600 may also include a battery 609 that is configured to provide electrical power to the components of the device 600. The battery 609 may include one or more power storage cells that are linked together to provide an internal supply of electrical power. The battery 609 may be operatively coupled to power management circuitry that is configured to provide appropriate voltage and power levels for individual components or groups of components within the device 600. The battery 609, via power management circuitry, may be configured to receive power from an external source, such as an AC power outlet. The battery 609 may store received power so that the device 600 may operate without connection to an external power source for an extended period of time, which may range from several hours to several days.

In some embodiments, the device 600 includes one or more input devices 610. An input device 610 is a device that is configured to receive user input. The one or more input devices 610 may include, for example, a push button, a touch-activated button, a keyboard, a key pad, or the like (including any combination of these or other components). In some embodiments, the input device 610 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 620 and the force sensor 622 are depicted as distinct components within the device 600.

In some embodiments, the device 600 includes one or more output devices 618. An output device 618 is a device that is configured to produce an output that is perceivable by a user. The one or more output devices 618 may include, for example, a speaker, a light source (e.g., an indicator light), an audio transducer, a haptic actuator, or the like.

The device 600 may also include one or more sensors 624. In some cases, the sensors may include a fluid-based pressure-sensing device (such as an oil-filled pressure-sensing device) that determines conditions of an ambient environment external to the device 600, a temperature sensor, a liquid sensor, or the like. The sensors 624 may also include a sensor that detects inputs provided by a user to a crown of the device (e.g., the crown 112). As described above, the sensor 624 may include sensing circuitry and other sensing elements that facilitate sensing of gesture inputs applied to an imaging surface of a crown, as well as other types of inputs applied to the crown (e.g., rotational inputs, translational or axial inputs, axial touches, or the like). The sensor 624 may include an optical sensing element, such as a charge-coupled device (CCD), complementary metal-oxide-semiconductor (CMOS), or the like. The sensors 624 may correspond to any sensors described herein or that may be used to provide the sensing functions described herein.

The device 600 may also include a touch sensor 620 that is configured to determine a location of a touch on a touch-sensitive surface of the device 600 (e.g., an input surface defined by the portion of a cover 108 over a display 109). The touch sensor 620 may use or include capacitive sensors, resistive sensors, surface acoustic wave sensors, piezoelectric sensors, strain gauges, or the like. In some cases the touch sensor 620 associated with a touch-sensitive surface of the device 600 may include a capacitive array of electrodes or nodes that operate in accordance with a mutual-capacitance or self-capacitance scheme. The touch sensor 620 may be integrated with one or more layers of a display stack (e.g., the display 109) to provide the touch-sensing functionality of a touchscreen. Moreover, the touch sensor 620, or a portion thereof, may be used to sense motion of a user's finger as it slides along a surface of a crown, as described herein.

The device 600 may also include a force sensor 622 that is configured to receive and/or detect force inputs applied to a user input surface of the device 600 (e.g., the display 109). The force sensor 622 may use or include capacitive sensors, resistive sensors, surface acoustic wave sensors, piezoelectric sensors, strain gauges, or the like. In some cases, the force sensor 622 may include or be coupled to capacitive sensing elements that facilitate the detection of changes in relative positions of the components of the force sensor (e.g., deflections caused by a force input). The force sensor 622 may be integrated with one or more layers of a display stack (e.g., the display 109) to provide force-sensing functionality of a touchscreen.

The device 600 may also include a communication port 628 that is configured to transmit and/or receive signals or electrical communication from an external or separate device. The communication port 628 may be configured to couple to an external device via a cable, adaptor, or other type of electrical connector. In some embodiments, the communication port 628 may be used to couple the device 600 to an accessory, including a dock or case, a stylus or other input device, smart cover, smart stand, keyboard, or other device configured to send and/or receive electrical signals.

Figure 7:
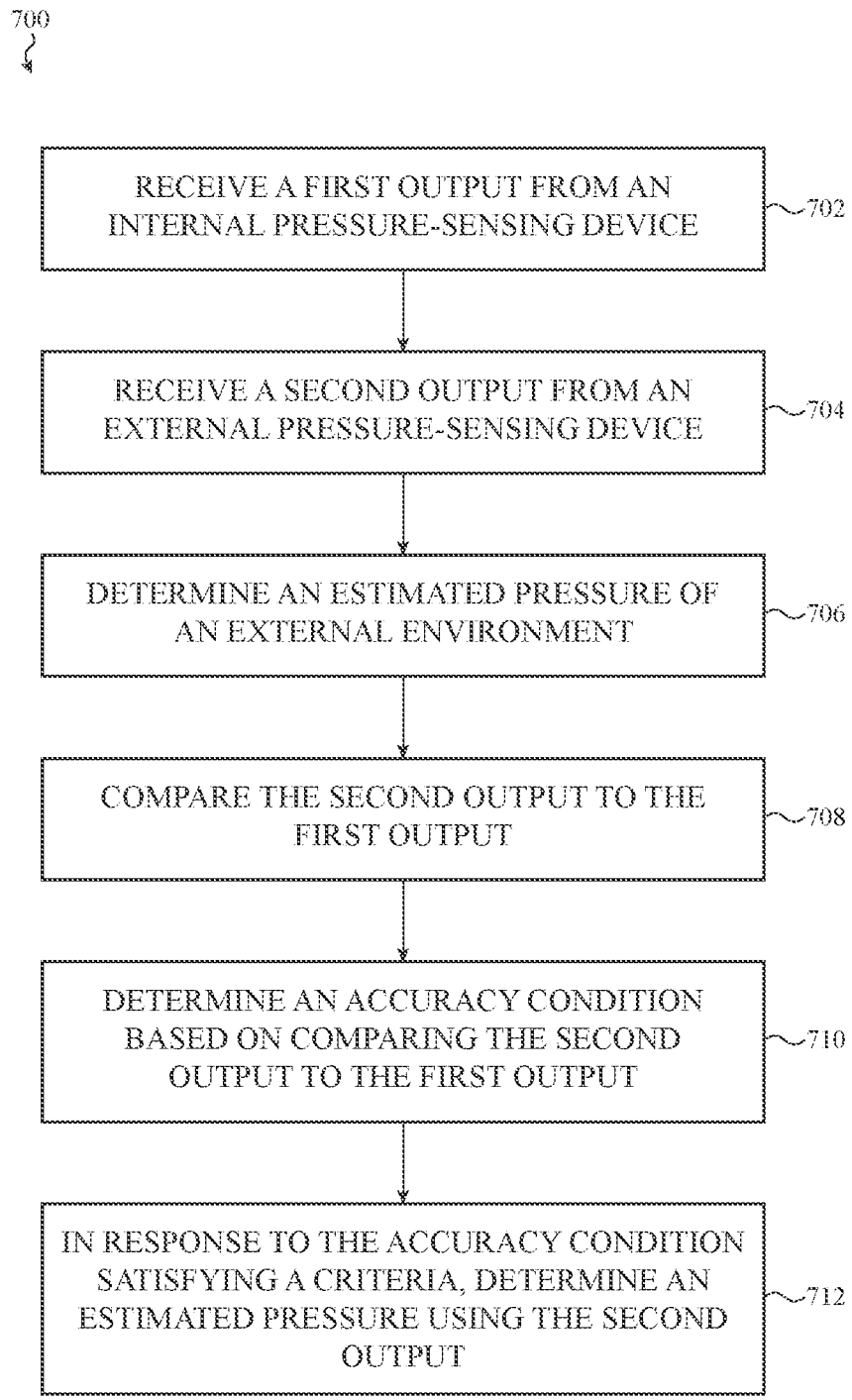
FIG. 7 is a block diagram illustrating operations performed by a sample electronic device incorporating internal and external pressure-sensing devices.

FIG. 7 depicts an example of a process for operating an electronic device such as a wearable electronic device 100 as described herein. The process may include operating one or more components including a pressure-sensing system such as a pressure-sensing system including an internal pressure-sensing device 230 and an external pressure-sensing device 235 as described herein; one or more processing units such as processing unit 240 as described herein; as well as other components such as a display, input mechanisms (e.g., touch screen, crown, buttons, etc.), speaker and/or speaker components as described herein.

At 702, a processing unit of an electronic device may receive a first output signal from an internal pressure-sensing device. The first output signal may include an electrical output from the internal pressure-sensing device. In some case, the first output signal may include an analog electrical output from the internal pressure-sensing device, while in other cases the first output signal may include a digital output or a combination of analog and digital outputs from the internal pressure-sensing device. The first output signal may generate an electrical output based on a response of one or more sensing components to an environmental pressure. For example, if the pressure-sensing device includes a piezo-resistive sensor, MEMs or fluid based sensor, an electrical output signal may be generated based on a deflection of one or more components of the sensor in response to the atmospheric pressure.

At 704, the processing unit may receive a second output signal from an external pressure-sensing device. The second output signal may include an electrical output from the external pressure-sensing device. In some case, the second output signal may include an analog electrical output from the external pressure-sensing device, while in other cases the second input signal may include a digital output or a combination of analog and digital outputs from the external pressure-sensing device. The second output signal may generate an electrical output based on a response of one or more sensing components to a pressure inside the electronic device. For example, if the pressure-sensing device includes a piezo-resistive sensor, MEMs or fluid based sensor, an electrical output signal may be generated based on a deflection of one or more components of the sensor in response to the internal pressure of the electronic device.

At 706, the processing unit may determine an estimated pressure of the external environment using the second output signal. For example, the processor may correlate an electrical output (e.g., voltage level) of the second output signal to a pressure value. Accordingly, the processor may use the electrical output signal from the external pressure-sensing device to determine an atmospheric pressure of the external environment.

At 708, the processing unit may compare the second output signal to the first output signal. In some cases, this may include comparing values of an electrical output (e.g., voltage level) of the second output signal and the first output signal. In other cases, the processing unit may convert each of the output signals to a common measurement such as a pressure measurement and compare pressure values associated with each of the first and second output signals.

At 710, the processing unit may determine an accuracy condition based on a comparison between the second output signal and the first output signal. For example, the processing unit may determine the accuracy condition of the external pressure-sensing device based on a difference between the second output signal and the first output signal. If the difference between the second output signal and first output signal does not satisfy a threshold (e.g., exceeds an accuracy criteria and/or an accuracy threshold, is below an accuracy threshold by a certain amount, and so on) the processor may determine that the external pressure-sensing device is not outputting accurate data. The accuracy condition may be satisfied when a threshold is not exceeded (e.g., when a difference between the two sensors below the threshold and/or when a moisture condition indicates that a moisture level does not exceed a threshold) or, alternatively, when a threshold is exceeded (e.g., when an accuracy level exceeds a given threshold). In some cases, the processing unit may determine, from the comparison, that the external pressure-sensing device is wet. In other cases, the processing unit may determine that the external pressure-sensing device has drifted and needs to be calibrated.

At 712, the processing unit, in response to the accuracy condition satisfying a criteria, may determine a pressure measurement using the second output signal. For example, if the accuracy condition satisfies the criteria, the processing unit may determine that the external pressure-sensing device is not wet and/or does not need to be calibrated. Accordingly, the processing unit may use this device to determine pressure measurements associated with the electronic device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. A wearable electronic device comprising:
    a housing comprising:
        an internal wall separating a first internal chamber from a second internal chamber; and
        an outer shell defining an audio port that connects the second internal chamber to an external environment;
    a membrane positioned at an opening defined in the internal wall and configured to equalize a first pressure within the first internal chamber with respect to a second pressure of the external environment;
    a first pressure-sensing device positioned in the first internal chamber and configured to produce a first output;
    a second pressure-sensing device positioned in the second internal chamber and configured to produce a second output; and
    a processing unit operatively coupled to the first and second pressure-sensing devices, the processing unit configured to:
        in accordance with a determination that an accuracy condition satisfies a criteria, determine an estimated pressure of the external environment using the second output; and
        in accordance with a determination that the accuracy condition does not satisfy the criteria, determine the estimated pressure of the external environment using the first output.

2. The wearable electronic device of claim 1, wherein the processing unit is configured to determine the accuracy condition based on a comparison between the first output and the second output.

3. The wearable electronic device of claim 2, wherein:
    the criteria is a threshold;

the accuracy condition is a moisture level that is based on a difference between the first output and the second output;

the accuracy condition satisfies the criteria when the processing unit determines that the second pressure-sensing device is not wet; and the processing unit is configured to determine that the second pressure-sensing device is not wet at least partially in response to the moisture level not exceeding the threshold.

4. The wearable electronic device of claim 3, wherein the processing unit is configured to initiate a water ejection procedure in response to determining that the second pressure-sensing device is wet.

5. The wearable electronic device of claim 2, wherein:
the criteria is a threshold;
in response to the processing unit determining that the accuracy condition exceeds the threshold, determine the estimated pressure using the first output; and
in response to the processing unit determining that the accuracy condition does not exceed the threshold, determine the estimated pressure using the second output.

6. The wearable electronic device of claim 2, wherein:
the criteria is a threshold;
the accuracy condition is based on a difference between the first output and the second output; and
in response to the processing unit determining that the difference exceeds the threshold, using the first output to determine a calibration offset for the second pressure-sensing device.

7. The wearable electronic device of claim 1, wherein:
the accuracy condition is a moisture level of the second pressure-sensing device; and
the criteria is not satisfied when the moisture level indicates that the second pressure-sensing device is wet.

8. The wearable electronic device of claim 7, wherein in response to determining the estimated pressure using the first output, determining the estimated pressure using the second output after a duration has lapsed.

9. The wearable electronic device of claim 7, wherein:
in response to determining the estimated pressure using the first output, monitoring the second output; and
in accordance with the second output indicating that the second pressure-sensing device is dry, determining the estimated pressure using the second output.

10. The wearable electronic device of claim 1, wherein the accuracy condition satisfies the criteria when a user input is provided to the wearable electronic device.

11. The wearable electronic device of claim 10, wherein the user input includes a selection of a water-based user activity.

12. An electronic device comprising:
a housing defining a first internal chamber and a second internal chamber, the second internal chamber coupled to an external environment by a port;
an air-permeable membrane configured to equalize a first pressure of the first internal chamber with a second pressure of the external environment;
a first pressure-sensing device positioned in the first internal chamber and configured to produce a first output;
a second pressure-sensing device positioned in the second internal chamber and configured to produce a second output; and
a processing unit operatively coupled to the first and second pressure-sensing devices, the processing unit configured to:
determine an estimated pressure of the external environment using the second output;
detect a change in a monitored condition of the second pressure-sensing device; and
in accordance with a determination that the change exceeds a threshold, determine the estimated pressure of the external environment using the first output.

13. The electronic device of claim 12, wherein:
in accordance with a determination that the change does not exceed the threshold, continue to determine the estimated pressure using the second output.

14. The electronic device of claim 12, wherein:
the monitored condition is a moisture level of the second pressure-sensing device; and
the change in the moisture level exceeding the threshold indicates that the second pressure-sensing device is wet.

15. The electronic device of claim 12, wherein:
in response to the change in the monitored condition exceeding the threshold, the processing unit is configured to initiate a calibration procedure.

16. The electronic device of claim 15, wherein the processing unit is configured to determine the change in the monitored condition based on a comparison between the first output and the second output.

17. A method for operating a wearable electronic device, the method comprising:
receiving a first output from an internal pressure-sensing device located inside a sealed internal chamber of the wearable electronic device;
receiving a second output from an external pressure-sensing device located outside the sealed internal chamber of the wearable electronic device;
comparing the second output to the first output;
determining an accuracy condition based on the comparison of the second output to the first output; and
in response to the accuracy condition satisfying a criteria, determining an estimated pressure using the second output.

18. The method of claim 17, wherein:
the accuracy condition does not satisfy the criteria when a moisture level indicates that the external pressure-sensing device is wet; and
in response to the accuracy condition not satisfying the criteria, determining the estimated pressure using the first output.

19. The method of claim 18, further comprising:
in response to a determination that the external pressure-sensing device is wet, performing a water ejection procedure to remove water from the external pressure-sensing device; and
after the water ejection procedure is complete, determining the estimated pressure using the second output.

20. The method of claim 17, wherein:
the accuracy condition is based on a difference between the first output and the second output; and
in response to a determination that the accuracy condition exceeds a threshold, performing a calibration procedure to adjust a calibration offset of the external pressure-sensing device.

* * * * *